(12) United States Patent
Pezzetta et al.

(10) Patent No.: US 7,160,458 B2
(45) Date of Patent: Jan. 9, 2007

(54) METHOD FOR PURIFICATION OF PROCESS WATER FROM A KEROSENE DESULFURIZATION PLANT

(75) Inventors: Valentino Pezzetta, Rome (IT); Claudio Ulisse, Rocca di Papa (IT); Maurizio Giorgetti, Rome (IT); Bruno Conti, Localita Pantano di Grano (IT)

(73) Assignee: Idratech S.r.l. (IT)

( * ) Notice: Subject to any disclaimer, the term of this patent is extended or adjusted under 35 U.S.C. 154(b) by 46 days.

(21) Appl. No.: 10/480,032

(22) PCT Filed: Jun. 8, 2001

(86) PCT No.: PCT/IT01/00295

§ 371 (c)(1), (2), (4) Date: Jun. 7, 2004

(87) PCT Pub. No.: WO02/100781

PCT Pub. Date: Dec. 19, 2002

(65) Prior Publication Data

US 2004/0217051 A1 Nov. 4, 2004

(51) Int. Cl.
*C02F 3/00* (2006.01)

(52) U.S. Cl. .............. 210/606; 210/612; 210/620; 210/621; 210/631

(58) Field of Classification Search .............. 210/606, 210/612, 620, 621, 631
See application file for complete search history.

(56) References Cited

U.S. PATENT DOCUMENTS

| 4,011,882 A * | 3/1977 | Nivens et al. ........... 137/15.05 |
| 4,347,226 A * | 8/1982 | Audeh et al. ............... 588/318 |
| 5,095,171 A * | 3/1992 | Feimer et al. ............. 585/819 |
| 6,045,695 A * | 4/2000 | Janssen et al. ............. 210/611 |
| 6,596,038 B1 * | 7/2003 | Moreton et al. ............. 44/389 |
| 2004/0123514 A1 * | 7/2004 | Moreton et al. ............. 44/304 |
| 2005/0086856 A1 * | 4/2005 | Henry et al. ................ 44/421 |

OTHER PUBLICATIONS

"Selectfining™ Process" (© 2005 UOP LLC).*
"Merox™ Process for Kerosene / Jet Fuel Sweetening" (© 2003 UOP LLC).*
"Caustic-Free Merox™ Process for Kerosene / Jet Fuel Sweetening" (© 2003 UOP LLC).*

* cited by examiner

*Primary Examiner*—Chester T. Barry
(74) *Attorney, Agent, or Firm*—Leffert Jay & Polglaze, P.A.

(57) ABSTRACT

Method for purification of process water, in particular coming from a kerosene desulfurization plant, and related plant, comprising the steps of neutralizing the process water, carrying out a washing of the process water by a solvent, and biologically treating the process water with bacteria apt to degrade pollutants.

24 Claims, 1 Drawing Sheet

METHOD FOR PURIFICATION OF PROCESS WATER FROM A KEROSENE DESULFURIZATION PLANT

Figure 1:
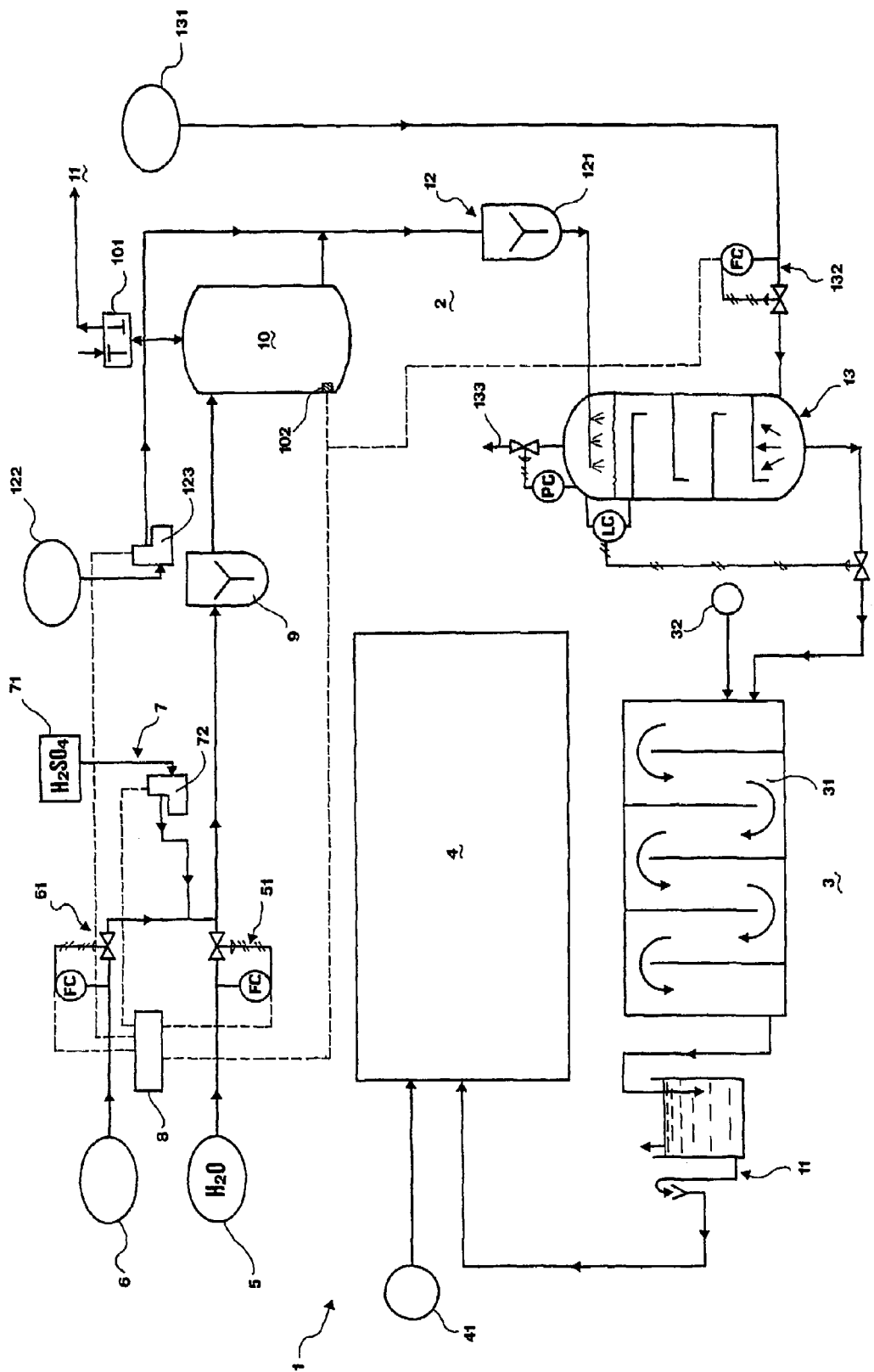

The present invention relates to a plant and to a method for purification of process water coming from a kerosene desulfurization plant.

Several industrial plants employ among their process fluids water, which in the plant duty cycle is subjected to pollution, thus requiring a subsequent treatment for the purification and the disposal thereof. This problem is particularly felt in the petrochemical field, and in particular in those industrial sites comprising kerosene desulfurization plants, e.g., of the so-called 'MEROX' type.

Usually, petrochemical industrial sites provide a reflux disposal section comprising a chemico-physical treatment unit and a biological treatment unit in which all the process waters of the site are purified. However, waters coming from the kerosene desulfurization plant, due to their elevated polluting power, cannot be treated in this section. Therefore, these waters have to be transferred to a remote site, whereat they be purified and disposed of by skilled operators, usually by incineration processes. It will be understood that such a disposal entails relevant logistic complication, thus proving extremely costly as well.

A pretreatment which sometimes is applied in the same industrial site of the desulfurization plant for purification of waters coming from the latter is based on acidification and Nitrogen stripping. However, this fails to yield satisfactory results, further having the drawback of yielding a highly polluted gaseous stream which has to be treated with activated carbon filters, with the entailed extremely high costs.

Alternate disposal methods are based on evaporation, on oxidation with hydrogen peroxide or other chemical substances with an equivalent oxidizing power, and on oxidation by ozonization. However, likewise methods do not find an industrial application due to the very high cost and the practical implementation and management difficulties thereof.

For example, EP-A-1 016 632 discloses a process for the treatment of refinery soda residues, wherein a stripping step by water vapor is provided.

This problem is solved with a method as set forth in claim 1.

The present invention provides several relevant advantages.

The main advantage thereof lies in that it provides an effective and cost-effective method for purification of water coming from a kerosene desulfurization plant, implementable at the same industrial site of the latter.

Other advantages, features, and the operation modes of the present invention will be made apparent in the following detailed description of some embodiments thereof, given by way of example and without limitative purposes. Reference will be made to FIG. 1 of the attached drawing, showing the flow chart of an embodiment of the plant for purification according to the present invention.

First of all, an embodiment of the method according to the invention for the depuration, and in particular the drainage, the degradation and the disposal, of waters coming from a kerosene desulfurization plant, which will hereinafter be called process water, will be described. This method will be illustrated with particular reference to waters coming from a MEROX-type plant comprised in a refinery associated industrial site.

In such a plant, at the end of desulfurization the process water typically has:

an elevated pH value, generally >10, caused by the high concentration of free soda;

an elevated concentration of phenols, generally of a >1,000 mg/l value;

an elevated COD (i.e., Chemical Oxygen Demand) value, generally >20,000 mg/l; and an elevated content of surfactants.

As it will be known to those skilled in the art, said chemical oxygen demand indicates the amount of oxygen required to chemically oxidize the pollutants present in the volume unit of water, hence being strictly related to the organic load in the water flow under exam.

Moreover, generally such process water is also evil-smelling.

According to the invention, the method provides first of all a chemico-physical treatment, aimed at eliminating the water-insoluble pollutants and at carrying out a preliminary purifying action with respect to the soluble pollutants. This chemico-physical treatment is mainly carried out through a step of neutralizing the process water and a step of washing the latter with a solvent.

The invention further provides a biological treatment, in which the process water is degraded with the addition of biotechnological agents, in particular bacteria apt to degrade specific pollutants, in order to eliminate the water-soluble pollutants.

In the present embodiment, said neutralizing step provides the use of sulfuric acid as neutralizing agent, in quantities preferably ranging from 500 to 2,000 mg per liter of process water, and preferably with a >98% concentration. The sulfuric acid is preferably metered as a function of the current flow rate of process water and of the pH of the latter, optionally measured downstream of the neutralizing step itself.

Moreover, the neutralizing step is carried out in association with a process water diluting step. This diluting is carried out with external water, preferably in a 1:1 ratio with the flow rate of the process water, pre-additivated with said sulfuric acid.

It will however be understood that the neutralization of the process water can also be carried out according to modes alternatives to the ones hereto described. E.g., the sulfuric acid can be inletted after the admixture between dilution water and process water. Moreover, an acid alternate to the sulfuric one can be employed. Furthermore, the diluting step can be totally absent, the acid being directly inletted into the process water. However, in this latter case a greater quantity of sulfuric acid would be required to attain the same neutralizing effect.

Downstream of said neutralizing step, the process water is then subjected to an equalizing step, during which it impounds in a tank for a predetermined period of time, preferably less than 1 hour, to regularize the water flow.

The process water is then subjected to a step of adding with a surfactant, preferably biodegradable, and it comprises, e.g., fatty alcohols in quantities preferably ranging from 500 to 2,000 mg per liter of process water. In this case as well, the quantity of surfactant inletted in the process water is preferably controlled as a function of the flow rate of the latter.

The presence of this latter step of the method for purification is preferable in order to enhance the effectiveness of the subsequent steps of the method, in particular the washing step.

The washing step provides a washing, preferably in countercurrent, of the process water with a solvent. In the present example, the solvent consists of kerosene that has been treated for the reduction of sulfur compounds, adducted with a flow rate equal to about the 10% of the flow rate of the process water.

With the washing step, a first extraction of the phenols present in the process water, thereby decreasing the concentration thereof towards the lawful threshold (typically 0.5 mg/l), a reduction of the COD and a reduction of the surfactants in the water are attained.

As far as the biological treatment is concerned, in the present example it in turn provides a pretreating step, apt to raise the redox potential of the process water, and a subsequent potentiating step, apt to degrade with bacteria the pollutants of the process water. The raise in the redox potential attained in the pretreating step enhances the effectiveness of the biological degradation carried out in the potentiating step.

In the pretreating step the process water is additivated with biotechnological agents of known type apt to allow, besides said raising of the redox potential, the degradation of substances causing foul odors, thereby attaining a further abatement of the organic pollutant load. In particular, during the pretreating step in the process water biotechnological agents selected from a group comprising oligoelements, nutrients, enzymatic products and sporified biofixed bacteria are inletted.

After the pretreating step, the process water is subjected, according to known modes, to a controlled drainage inside the drain collector and to additivation with a deodorizing agent, e.g., of enzymatic type.

In the subsequent potentiating step, in the process water specific bacteria, selected from a group comprising bacteria for the degradation of phenols, surfactants, aromatic compounds and hydrocarbons, and also biotechnological agents selected from a group comprising nutrients, like Nitrogen and Phosphorus, and oligoelements, are inletted.

It will be understood that the potentiating step completes the abatement of all the pollutants present in the process water. In particular, in this step of the method the COD value is further abated and a final degradation of the surfactants, only partially eliminated in the preceding chemico-physical treating step, is attained.

Preferably, during the potentiating step, in the process water biotechnological products containing bacterial species selected from a group comprising: *Nitrosomonas europea, Nitrosomonas subtilis, Bacillus subtilis, Bacillus lichenifor-mis, Bacillus cereus, Pseudomonas fluorescens E, Pseudomonas putida, Pseudomonas subtilis, Alcaligenes, Lactobacillus lactiss, Lactobacillus helveticu, Trichoderma harzanium, Trichoderma reesci,* and *Phanerocheate chrysoporium*, are inletted.

Preferably, in the biological treating step a step of increasing the metabolic activity of the bacteria prior to the inletting thereof in the process water, so that such activity already be at its peak upon inletting the bacteria themselves, is also provided.

The hereto mentioned biotechnological agents may be metered as a function of the COD value of the process water.

Preferably, solely non genetically modified products are used.

An alternate embodiment also provides a further step of the method for purification based on the use of a biofilter. This step is advisable when the reflux treatment section cannot bear the polluting load associated with the process water outletted from the above disclosed washing step.

FIG. 1 relates to a plant 1 for purification of water coming from a MEROX-type kerosene desulfurization plant, comprised in a refinery-associated industrial site.

The plant 1 carries out the above described method for purification of the process water. Therefore, this comprises two main sequentially arranged sections, each apt to subject the process water to a different treatment, and in particular:

a first section, hereinafter referred to as chemico-physical and indicated with 2 in FIG. 1, in which the process water is mainly subjected to neutralization and to solvent washing; and a section, hereinafter referred to as biological, in which the process water is degraded by a treatment with biotechnological agents, in particular bacteria In the present embodiment, it is provided that the biological section be implemented integrating the reflux treatment structures usually is in the industrial site and hereto mentioned with reference to the known art. In particular, the biological section in turn comprises a pretreating unit 3 and a potentiating unit 4, the latter comprising the structures of the biological treatment unit. These units 3 and 4 respectively implement the pretreating and the potentiating steps hereto described with reference to the method of the invention.

Each of the hereto introduced sections of the plant for purification 1 will hereinafter be detailed.

At the inlet to the chemico-physical section 2, the plant 1 first of all provides means 5 for supplying the process water, adducting the latter from a receiver usually located in the industrial site to the section 2 itself.

Always at the inlet of the chemical-physical section 2, the plant for purification 1 also comprises means 6 for supplying the dilution water.

The inlet flow rates of the process water and of the dilution water are controlled by respective flow control means, e.g., servo valves indicated with 51 and 61, respectively, in turn connected to a control unit 8 which will be described later.

Since the supplying means 5 and 6 essentially comprise tanks, conduits, pumps and valves of traditional type, hereinafter a further description thereof will be omitted.

The chemico-physical section 2 first of all provides a unit 7 for additivation of sulfuric acid, provided via a dedicated feeder line.

In particular, the additivation unit 7 comprises adding means like a sulfuric acid receiver 71 and a metering pump 72 of the acid itself. The pump 72 is controlled by the above mentioned control unit 8, thereby implementing metering means apt to control the quantity of sulfuric acid inletted in the process water as a function of the flow rate of the latter.

Furthermore, the chemico-physical section 2 comprises a neutralizing unit 9, in which the dilution water additivated with sulfuric acid is admixed to the process water, in order to lower the pH value of the latter.

It will be now better appreciated that the employ of sulfuric acid as a neutralizing agent proves extremely advantageous, since it is inexpensive and also commonly employed at a petrochemical industrial site for other aims as well, thereby being easily adductible to the plant for purification 1.

The neutralizing unit 9 provides that the dilution of the process water be carried out directly on-line, using a first stationary mixer, it also indicated with 9, which promotes the homogenizing of process water, dilution water and sulfuric acid.

Preferably, the unit 9 is dimensioned so as to carry out the dilution in a 1:1 ratio.

Of course, variant embodiments could provide alternative dilution means, e.g., a different type of mixer.

After neutralization, the process water is sent to an apron or equalizing unit 10, comprising in particular a seal-closed equalizing reservoir, it also indicated with 10.

The equalizing reservoir 10 is provided with a so-called breathing valve 101, summarily sketched in FIG. 1. Such valve allows the discharge of the possible developed vapors directly in an apparatus 11 for the controlled drainage in a drain collector of the industrial site. In the apparatus 11, which will be detailed hereinafter, said vapors are washed with water, and optionally with a deodorizer.

The equalizing reservoir 10 further comprises a pH measurer 102, it also summarily sketched in FIG. 1, connected to said control unit 8, so as to allow a feedback control of the quantity of sulfuric acid to be inletted in the process water at the adding unit 7.

In the present embodiment, from the equalizing reservoir 10 the process water is piped, by a pump of traditional type, towards a surfactant adding unit 12.

In the present embodiment, from the equalising reservoir 10 the process water is piped, by a pump of traditional type, towards a surfactant adding unit 12.

The adding unit 12 comprises a second on-line stationary mixer 121 and associated surfactant supplying means. The latter in turn comprises a surfactant receiver 122 and a surfactant metering pump 123 of traditional type, the latter also controlled by the control unit 8 so as to implement surfactant metering means apt to control the quantity of surfactant inletted in the process water as a function of the flow rate of the latter.

From the second stationary mixer 121, the process water is piped to a washing unit 13, which provides the washing thereof with kerosene that has been treated for the reduction of sulfur compounds.

In the present embodiment, the washing unit 13 comprises a perforated-plate column, it also indicated with 13, for the countercurrent washing, associated with level control means of traditional type schematically depicted in FIG. 1. In such column 13 a continuous phase, consisting of the kerosene that has been treated for the reduction of sulfur compounds, and a disperse phase, consisting of the process water to be treated, are provided.

The structure of the column 13, e.g., the number of plates thereof, could of course vary according to the flow rate of the process water to be treated and to the pollutant concentration. Moreover, other apparatuses for contacting the two liquids therebetween, e.g., filled-type columns or spray columns, could be used.

The kerosene is fed to the plate column 13 with feeding means comprising a reservoir 131 and kerosene metering means 132. The latter could consist, e.g., of flow control valves of traditional type, controlled by the control unit 8.

Upon passing into the extraction column 13, the kerosene is recovered in the top section thereof and sent, via a suitable downflow line 133 associated with pressure control means of traditional type, to a desired destination, like, e.g., a crude, gas oil or gasoline reservoir. In particular, as above mentioned, the plant for purification 1 of the present embodiment is incorporated in a petrochemical industrial site. Hence, the kerosene exiting the column 13 can be reused in other units of the latter.

The process water exiting the washing unit 13 is instead sent to the biological pretreating unit 3 with a pump of traditional type.

In the present embodiment, the above mentioned control unit 8 is based on a PLC of known type. Summarizing the above, in the present embodiment the control unit 8 manages:

the flow rate of the process water and of the dilution water by the servo valves 51 and 61;

the sulfuric acid metering, by the related metering pump 72 and the pH measurer 102;

the surfactant metering, by the related metering pump 123; and the flow rate of the kerosene by the related metering means 132.

Hence, the control unit 8 allows a control of the parameters of the plant 1 as a function of the flow rate of the process water to be treated, and a near-total automation of the chemico-physical section 2.

For performing the control of the above mentioned various components of the plant 1, the control unit 8 provides suitable data transmission/reception connections of traditional type, represented by hatched lines in FIG. 1.

The control unit 8 can further control a plurality of flow and/or pressure control means of traditional type, distributed over the entire plant 1, some of which are schematically depicted in FIG. 1.

It will be appreciated that the automatic control thus implemented also ensures a safe operation of the entire plant for purification 1.

As to the biological section of the plant 1, the pretreating unit 3 mainly comprises a sealed biological tank 31 and feeding means 32 of said biotechnological pretreatment agents.

In the present embodiment, the biological tank 31 has a plurality of floating supports, apt to create a contact surface between the active biomass, i.e., said biotechnological agents, and the pollutants still present in the process water. Moreover, the tank 31 has an aeration system which accelerates the degrading action of such biotechnological agents.

The metering and feeding means 32 comprises a powder meter, inletting into the tank 31 a preset quantity of biotechnological agents at preset time intervals, e.g., once a day.

A variant embodiment could provide that also the biotechnological agent metering be managed by the control unit 8 of the chemico-physical section 2.

From the pretreating unit 3, the process water is piped to the above mentioned apparatus 11 for the controlled drainage into the drain collector. The apparatus 11 is preferably dual water-seal to allow a washing of vapors possibly evolving from the process water and to prevent the formation of foul odors and the leaking of possible pollutants in the atmosphere.

The apparatus 11 also provides means for inletting in the process water flow a deodorizing agent, e.g., of enzymatic type, the metering thereof being carried out by a liquid metering system having a flow rate which be constant and independent from the flow rate of the process water to be treated.

A variant embodiment provides that also the drainage apparatus 11, and in particular the metering of the deodorizing agent, be controlled by the control unit 8 as a function of the actual flow rate of the process water.

Those skilled in the art will understand that the dimensioning and the conventional parameters of the apparatus 11 can be selected according to the specific needs for purification and of the industrial site.

It will also be appreciated that the action of the bacteria added in the pretreating step continues along the petrochemical plant drain collector, providing a remarkable reduction of the organic load actually reaching an outside purifier.

The process water is then piped to the potentiating unit 4, which provides, besides the treatments usually provided in the known purification plants, a treatment with the biotechnological agents, and in particular specific bacteria, hereto mentioned with reference to the method of the invention.

In the present embodiment, the additivation with the bacteria and the other above disclosed products is automatically carried out by feeding means 41. The latter comprises an additivation system, sometimes referred to as 'rouser' by the experts, apt to increase the metabolic activity of the bacteria prior to the inletting thereof into the biological section of the plant for purification 1.

An alternative embodiment of the additivation system provides instead a powder meter inletting in the plant for purification the bacterial products directly as provided by the producer.

Those skilled in the art will understand that the above indicated first type of additivation system is advisable when lyophilised products be employed, whereas the second system is more suitable for biofixed sporified products.

In the present embodiment, the feeding means 41 also comprises a programmable nutrient and bacteria meter, allowing to inlet fixed quantities of bacteria and nutrients at preset time intervals.

A variant embodiment provides instead that said nutrient and bacteria meter be manually operated.

Another variant further provides that the metering of the bacteria be controlled as a function of the COD values found in laboratory analyses. This control could be manually carried out or managed by a control unit, e.g., the above described control unit 8, with feedback control techniques of traditional type.

Those skilled in the art will understand that all the units of the above described plant for purification could be dimensioned so as to satisfy specific needs related to the properties of the water to be treated, e.g., to emphasize the role of some units, and, therefore, of some steps of the treatment for purification, with respect to the others.

Several further embodiments of the plant and the method of the invention will hereinafter be illustrated.

An alternative embodiment of the method for purification provides that the process waters be pretreated with biodegradable surfactants directly into the stocking reservoir of the petrochemical plant of origin, in order to recover a fraction of the hydrocarbon present therein and to partially reduce the initial polluting load of the process water.

Another embodiment provides that, immediately upstream of the washing unit, the process water be heated at a temperature preferably comprised in a range of about 50 to 60° C. by traditional means and techniques, e.g., inserting inside of the equalizing reservoir a coil supplied with low-pressure steam. In this case, the breathing valve located topwise of the equalizing reservoir could directly discharge the excess vapors into a process water receiver.

This heating allows to accelerate water-kerosene separation in the washing step and, in some cases, to abate a greater quantity of phenols enhancing the in-kerosene solubility thereof.

It will be now better appreciated that the hereto disclosed plant for purification could be integrated in the same industrial site of the MEROX plant, typically near to the process water receiver.

A specific application example of the method of the invention carried out in the above described plant for purification will hereinafter be described. Water coming from a MEROX kerosene desulfurization plant was treated having, at the beginning of the purification treatment, the following pollution parameter values:
COD=23,000 mg/l;
Phenols=1,700 mg/l;
Surfactants=600 mg/l; and
pH=12.5.

Firstly, a neutralizing step with sulfuric acid was carried out. In particular, about 1,000 mg of concentrated (98%) sulfuric acid per liter of process water were added to outside water in a 1:1 dilution ratio with the flow rate of the process water. The outside water and the sulfuric acid were then admixed to the process water in said stationary mixer.

At the end of the neutralizing step, the process water exhibited a pH value equal to 8.5.

The process water was then left to rest for about 30 minutes in said equalizing reservoir.

The process water was then additivated with about 1,000 mg of fatty alcohols per liter of process water.

The process water was then piped in said plate column for the step of washing with kerosene that has been treated for the reduction of sulfur compounds. At the end of this step, the process water exhibited: COD=11,000 mg/l; Phenols=700 mg/l; Surfactants (naphtenates)=300 mg/l; and pH8.5.

The process water was then subjected to the biological treatment.

In particular, in the pretreating unit, the process water was additivated with about 0.5 kg/day of bacterial products and with nutrients and oligoelements, raising the redox potential thereof from about −300 mV to positive values.

In the potentiating unit, in the process water the following bacterial species were inletted: *Nitrosomonas europea, Nitrosomonas subtilis, Bacillus subtilis, Bacillus licheniformis, Bacillus cereus, Pseudomonas fluorescens E, Pseudomonas putida, Pseudomonas subtilis, Alcaligenes, Lactobacillus lactiss, Lactobacillus helveticu, Trichoderma harzanium, Trichoderma reesci, e Phanerocheate chrysoporium.*

Thus, for the process water, pollution parameter values compatible with the lawful limits regulating water discharge, in particular: COD<160 mg/l; Phenols<0.5 mg/l; Surfactants<2 mg/l; and pH=5.5–9.5, were attained.

It will be understood that the plant and the associated method for purification of the invention could also be applied to kerosene desulfurization plants other than the MEROX type hereto considered. Moreover, the invention could effectively be applied in all those industrial sites, especially the petrochemical ones, having plants yielding relatively reduced flows of highly polluted water. In these cases, the type of solvent for carrying out said washing step could vary to conform to the specific needs of the industrial site in which the plant for purification of the invention is applied.

The present invention has hereto been described with reference to preferred embodiments thereof. It is understood that there could be other embodiments afferent to the same inventive concept, all falling within the protective scope of the appended claims.

The invention claimed is:

1. A method for purification of process water coming from a kerosene desulfurization plant, comprising the steps of:
   neutralizing the process water;
   carrying out a washing of the process water by a solvent; and
   biologically treating the process water with bacteria apt to degrade pollutants, wherein said washing step provides a countercurrent washing of the process water using kerosene that has been treated for the reduction of sulfur compounds as a solvent.

2. The method according to claim 1, wherein said neutralizing step provides the use of sulfuric acid as a neutralizing agent.

3. The method according to claim 2, wherein said neutralizing step is carried out using concentrated (>98%) sulfuric acid in a quantity comprised in a range of about 500 to 2,000 mg per liter of process water.

4. The method according to claim 1, wherein said neutralizing step provides that the quantity of neutralizing agent inletted in the process water be controlled as a function of the flow rate of the latter.

5. The method according to claim 4, wherein the quantity of neutralizing agent inletted in the process water is controlled as a function of the pH of the latter, measured downstream of said neutralizing step.

6. The method according to claim 1, wherein said neutralizing step provides a dilution of the process water.

7. The method according to claim 6, wherein said dilution is carried out ma 1:1 ratio.

8. The method according to claim 1, comprising a step of equalizing the process water downstream of said neutralizing step.

9. The method according to claim 1, comprising, upstream of said washing step, a step of adding a surfactant.

10. The method according to claim 9, wherein the quantity of surfactant inletted in the process water is regulated as a function of the flow rate of the latter.

11. The method according to claim 9, wherein said surfactant comprises fatty alcohols.

12. The method according to claim 11, wherein said step of adding a surfactant is carried out using fatty alcohols in a quantity comprised in a range of about 500 to 2,000 mg per liter of process water.

13. The method according to claim 1, wherein said kerosene has a flow rate equal to about 10% of the flow rate of process water.

14. The method according to claim 1, wherein said biological treating step provides that said bacteria be selected from a group comprising bacteria for the degradation of phenols, surfactants, aromatic compounds and hydrocarbons.

15. The method according to claim 1, wherein said biological treating step provides that said bacteria be selected from a group comprising *Nitrosomonas europea, Nitrosomonas subtilis, Bacillus subtilis, Bacillus licheniformis, Bacillus cereus, Pseudomonas fluorescens E, Pseudomonas putida, Pseudomonas subtilis, Alcaligenes, Lactobacillus lactiss, Lactobacillus helveticu, Trichoderma harzanium, Trichoderma reesci* and *Phanerocheate chrysoporium*.

16. The method according to claim 1, wherein said biological treating step provides an addition to the process water of biotechnological agents selected from a group comprising nutrients and oligoelements.

17. The method according to claim 1, wherein said biological treating step provides an addition to the process water of biotechnological agents metered as a function of the COD value of the process water.

18. The method according to claim 1, wherein said biological treating step comprises a pretreating step, apt to raise the redox potential of the process water, and a subsequent degrading step, apt to degrade the pollutants in the process water by bacteria.

19. The method according to claim 18, wherein said pretreating step provides the inletting in the process water of biotechnological agents selected from a group comprising oligoelements, enzymatic products and bacteria.

20. The method according to claim 19, wherein said bacteria are biofixed sporified.

21. The method according to claim 1, comprising a step of adding a deodorizing agent to the process water.

22. The method according to claim 1, comprising a step of treating by a biofilter.

23. The method according to claim 1, comprising, upstream of said washing step, a step of heating the process water.

24. The method according to claim 23, wherein said heating step provides a heating of the process water at a temperature comprised in a range of about 50 to 60° C.

* * * * *

UNITED STATES PATENT AND TRADEMARK OFFICE
CERTIFICATE OF CORRECTION

PATENT NO. : 7,160,458 B2 Page 1 of 1
APPLICATION NO. : 10/480032
DATED : January 9, 2007
INVENTOR(S) : Valentino Pezzetta et al.

It is certified that error appears in the above-identified patent and that said Letters Patent is hereby corrected as shown below:

Title Page at (73) Assignee:

After "Idratech S.r.l.", please insert -- Raffineria di Roma S.p.A. --.

Signed and Sealed this

Tenth Day of June, 2008

JON W. DUDAS
*Director of the United States Patent and Trademark Office*